United States Patent [19]

Morimoto et al.

[11] Patent Number: 5,375,109
[45] Date of Patent: Dec. 20, 1994

[54] MAGNETO-OPTICAL RECORDING AND/OR REPRODUCING DEVICE

[75] Inventors: Yasuaki Morimoto, Sakurashi, Japan; Friedhelm Zucker, Mönchweiler, Germany

[73] Assignee: Deutsche Thomson-Brandt GmbH, Villengen-Schwenningen, Germany

[21] Appl. No.: 880,939

[22] Filed: Jan. 16, 1992

[30] Foreign Application Priority Data

Jul. 14, 1989 [DE] Germany .............................. 3923328

[51] Int. Cl.$^5$ .............................................. G11B 7/085
[52] U.S. Cl. .................. 369/44.37; 369/44.28; 369/44.41; 369/116; 369/112
[58] Field of Search ............... 369/44.41, 44.37, 44.38, 369/44.25, 116, 110, 109, 108, 102, 50, 53, 54, 58, 112, 121, 122, 44.28

[56] References Cited

U.S. PATENT DOCUMENTS

| | | | |
|---|---|---|---|
| 4,893,298 | 1/1990 | Pasman et al. | 369/44.37 |
| 4,918,679 | 4/1990 | Opheij et al. | 369/44.37 |
| 5,014,253 | 5/1991 | Morimoto et al. | 369/121 |
| 5,191,571 | 3/1993 | Fukumoto et al. | 369/44.37 |

FOREIGN PATENT DOCUMENTS

| | | |
|---|---|---|
| 0173533 | 3/1986 | European Pat. Off. . |
| 3923328 | 1/1991 | Germany . |

OTHER PUBLICATIONS

Nakamura et al, "Compact two-beam head with a hybrid two-wavelength laser array for magneto-optic recording" Japanese Journal of Applied Physics, Supplements, vol. 26, No. 26–4, 1987, Tokyo Japan, pp. 117–120.

Patent Abstracts of Japan, vol. 11 No. 37 (P-543) (2484), 4 Feb. 1987 & JP-A-61 206947 (Nippon Kogaku K.K.) 13 Sep. 1986.

Patent Abstracts of Japan, vol. 11 No. 112 (P-565) (2559), 9 Apr. 1987 & JP-A-61 206436 (Ricoh Co Ltd) 18 Nov. 1986.

Patent Abstracts of Japan, vol. 10 No. 160 (P-465) (2216), 7 Jun. 1986 & JP-A-61 013458 (Hitachi Seisakusho K.K.) 21 Jan. 1986.

Patent Abstracts of Japan, vol. 10 No. 202 (P-477) (2258), 15 Jul. 1986 & JP-A-61 042738 (Hikari Yokoekawa) 1 Mar. 1986.

*Primary Examiner*—W. R. Young
*Assistant Examiner*—Muhammad Edun
*Attorney, Agent, or Firm*—Joseph S. Tripoli; Eric P. Herrmann; Ronald H. Kurdyla

[57] ABSTRACT

The two sets of data stored in pits and a magneto-optical layer of an optical recording/reproducing device can be read separately by the use of two lasers. The laser which reads/records the data stored in the pits operates at a wavelength $\lambda_1$ approximately four times the depth of the pits. The laser which reads/records the data stored in the magneto-optical layer operates at a wavelength $\lambda_2$ approximately twice the depth of the pits. The wavelength of the laser which reads the magneto-optical layer is adjusted and interference between the two signals is avoided.

5 Claims, 2 Drawing Sheets

MAGNETO-OPTICAL RECORDING AND/OR REPRODUCING DEVICE

This is a continuation of application PCT/EP No. 90/01038 filed Jun. 29, 1990 by Yasuaki Morimoto and Friedhelm Zucker.

BACKGROUND OF THE INVENTION

The invention is directed to a magneto-optical recording and/or reproducing device for a recording medium upon which one set of data are stored by means of so-called pits and another set of data are stored in a magneto-optical layer. A first laser, having a wavelength of approximately four times the depth of the pits scans the pits to read the data. A second laser, having a wavelength of approximately twice the depth of the pits reads the data stored in the magneto-optical layer. Because such a magneto-optical recording and reproducing device reads data which are stored in the pits and in the magneto-optical layer, care should be taken to ensure that the two signals do not interfere with each other, for example, through crosstalk.

The invention is a novel magneto-optical recording and/or reproducing device which is capable of simultaneously reading data stored by means of pits and a magneto-optical layer without the two data signals adversely affecting one another. The advantageous result is obtained by the use of a second laser which is automatically adjusted to the correct wavelength of the emitter light. The light emitted from the second laser is reflected from the recording medium onto a two-part photodetector and a push-pull signal is generated from the difference of the two-part photodetector. The phase position of the push-pull signal is compared with the phase position of a tracking error signal, which is generated by the first laser, and the regulating signal for adjusting the wavelength $\lambda_2$ of the second laser is obtained from the phase comparison. The wavelength $\lambda_1$ of the first laser is selected to be four times the depth of the pits, the optical path length thereby becomes $\lambda_1/2$. Accordingly, the pits modulate the light emitted by the first laser, as is the case with a normal compact disk, and the data stored in the pits is retrieved from the reflected light. However, because the wavelength $\lambda_2$ of the second laser is twice the depth of the pits, the optical path length is exactly $\lambda_2$ and the pits do not modulate the light from the second second laser is rotated to the left or the right, depending upon the data stored in the magneto-optical layer of the recording medium and the light from the second laser transmits only the data stored in the magneto-optical layer.

SUMMARY OF THE INVENTION

It is particularly advantageous for the second laser to be wavelength (frequency) adjustable. The light radiating from the second laser is reflected from the recording medium onto a two-part photodetector. In order to automatically adjust the wavelength of the second laser to the best value, a push-pull signal is generated by the two-part photodetector through a difference between its two output signals. The phase of the push-pull signal, which is obtained from the light of the second laser, is compared with the phase of the tracking error signal, which is generated in a known manner and is obtained from the light of the first laser. When the phases of the push-pull signal and the tracking error signal are equal, or opposite, the wavelength of the second laser is either too large or too small. When the push-pull signal is zero the second laser is tuned to the correct wavelength.

For the automatic tuning of the second laser the push-pull signal of the second laser and the tracking error signal of the first laser are fed to the inputs of a multiplier, the output of which is coupled via a low-pass filter to a servo amplifier. The control signal for the second laser wavelength is available at the output terminal of the servo amplifier.

DETAILED DESCRIPTION

Figure 1:
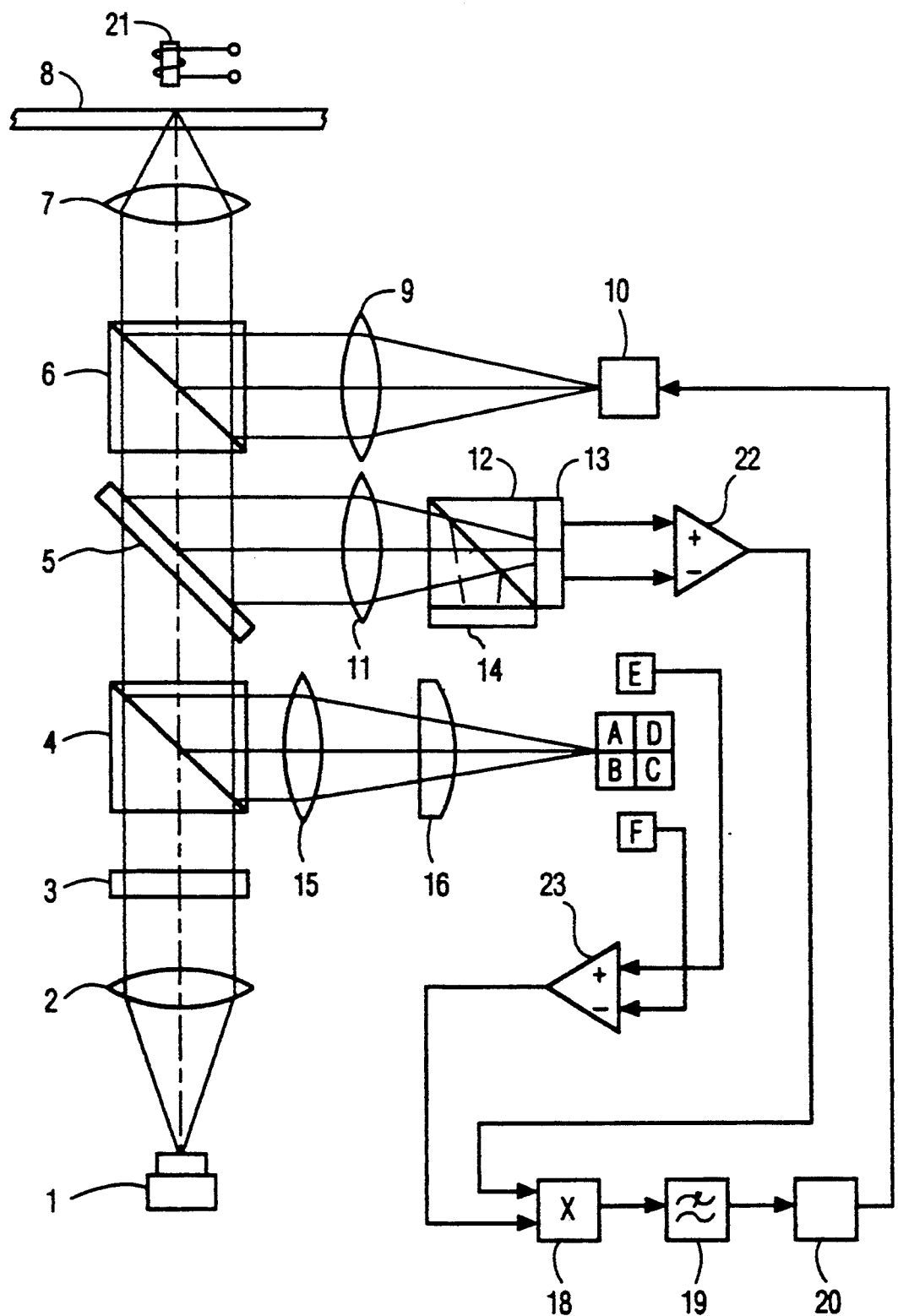
FIG. 1 is a preferred embodiment of the invention.

In FIG. 1, the light of the first laser 1 radiates through a collimator lens 2, a grid 3, a prismatic beam splitter 4, a dichroic mirror 5, a polarization beam splitter 6 and an objective lens 7 onto a recording medium 8, behind which a writing magnet 21 is located. The light of the second, adjustable laser 10 radiates laterally through a collimator lens 9 onto the polarization beam splitter 6 which deflects the light of the second laser 10 90° to also radiate onto the recording medium 8. The recording medium 8 reflects the light of the second laser 10 through the objective lens 7 and the polarization beam splitter 6 to the dichroic mirror 5 which deflects it 90° to a convex lens 11, behind which a polarization beam splitter 12 is located. One portion of the light is deflected 90° by the polarization beam splitter 12 onto a photodetector 14. The other portion of the light radiates in a straight line through the polarization beam splitter 12 onto a two-part photodetector 13. The two output terminals of the two-part photodetector 13 are coupled with the input terminals of a differential amplifier 22, which forms the push-pull signal $PS = 13a - 13b$ from the output signals $13a$ and $13b$ of the two-part photodetector 13. The data signal MO retrieved in magneto-optical fashion is formed in accordance with the following equation by means of an adder and a subtracter: $MO = 14a - 13a - 13b$. The output signal of photodetector 14 is designated $14a$.

The light emitted from the first laser 1 is reflected from the recording medium 8 through the objective lens 7, the polarization beam splitter 6 and the diochroic mirror 5 back to the prismatic beam splitter 4 which deflects it 90° to a convex lens 15, behind which a cylinder lens 16 is located. The cylinder lens 16 focusses the light of the first laser 1 onto a four-quadrant photodetector 17 having four quadrants A, B, C and D, as well as two photodetectors E and F. In a known manner, the data signal $OS = AS + BS + CS + DS$ and the focusing error signal $FE = AS + CS - BS - DS$ are formed; the output signals of the four quadrants A, B, C and D are respectively designated AS, BS, CS and DS. The photodetectors E and F are coupled with the inputs of a differential amplifier 23 which generates the tracking error signal $TE = ES - FS$. The output signals of the two photodetectors E and F are respectively designated ES and FS. The output of differential amplifier 22 is coupled to the first input terminal of amplifier 18 and the output terminal of differential amplifier 23 is coupled to the other input terminal of the multiplier 18, the output terminal of which is coupled via a low-pass filter 19 to a servo amplifier 20. The output terminal of the servo amplifier 20 is coupled to the control input terminal of the adjustable laser 10.

Figure 2:
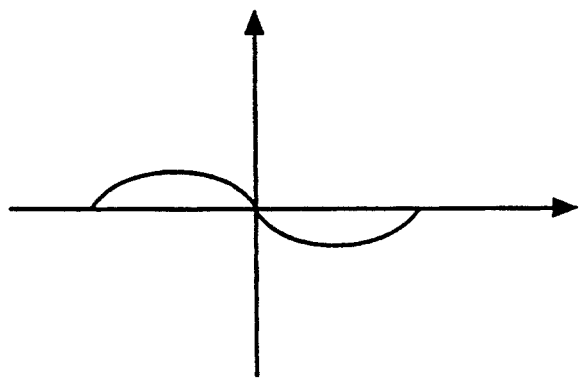
FIGS. 2 and 3 show the push-pull signal.
Figure 3:
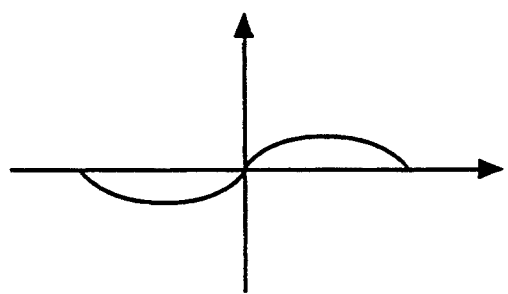

The push-pull signal PS obtained when the wavelength of the adjustable laser 10 is too long is shown in FIG. 2, and the push-pull signal when the wavelength of the adjustable laser 10 which is too short is shown in FIG. 3. The adjustment of the wavelength for the adjustable laser 10 is automatic and the depth of the pits is no longer significant. Therefore, disks having different pit depths can be scanned.

Figure 4:
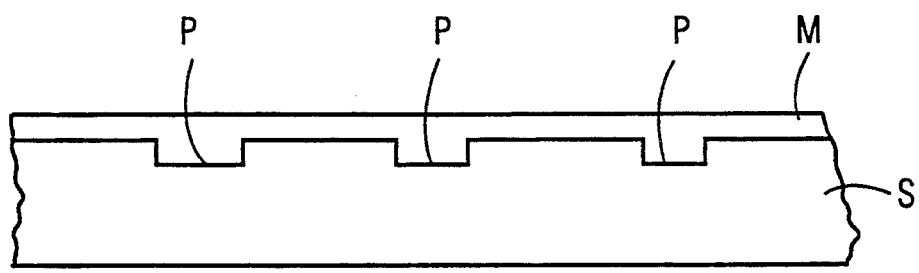
FIG. 4 shows a section through a magneto-optical disk.

A section through a disk is shown in FIG. 4. A magneto-optical layer M lies on a substrate layer S in which pits P are provided.

We claim:

1. A circuit for reading/recording data stored on a recording medium in pits and in a magneto-optical layer comprising:
    a first laser having a wavelength $\lambda_1$ approximately four times the depth of said pits for reading data stored in said pits;
    a second laser having a wavelength $\lambda_2$ approximately twice the depth of said pits for reading data stored in said layer;
    a two-part photodetector for receiving light emitted by said second laser and reflected from said magneto-optical layer and producing a push-pull signal from first and second photodetector signals provided by said two-part photodetector;
    tracking detector means responsive to light from said first laser and reflected from said recording medium for producing a tracking error signal; and
    means responsive to said push-pull signal and to said tracking error signal for providing a control signal to said second laser for automatically adjusting the wavelength of said second laser to substantially equal twice the depth of said pits.

2. The circuit of claim 1 further including a differential amplifier receiving said photodetector signals from said two-part photodetector, said circuit also including a multiplier having a first input responsive to a difference signal provided by said differential amplifier and a second input terminal responsive to said tracking error signal, and including a servo amplifier responsive to output signal provided by said multiplier for providing a control signal to adjust the wavelength of said second laser.

3. The circuit of claim 2 wherein said differential amplifier produces a push-pull signal, the phase of said push-pull signal is compared with the phase of said tracking error signal to produce said control signal for controlling the wavelength of said control signal.

4. A circuit for simultaneously reading/recording a first set of data stored on a recording medium in pits and a second set of data stored in a magneto-optical layer comprising:
    a first laser having a wavelength $\lambda_1$ approximately four times the depth of said pits for reading said first set of data;
    a second laser having a wavelength $l_2$ approximately twice the depth of said pits for reading said second set of data;
    a two-part photodetector for receiving light emitted by said second laser and reflected from said magneto-optical layer and providing first and second photodetector signals;
    a first differential amplifier responsive to said photodetector signals for producing a push-pull signal;
    tracking detector means responsive to light from said first laser and reflected from said recording medium for producing tracking detector signals;
    a second differential amplifier responsive to said tracking detector signals for producing a tracking error signal; and
    means responsive to said push-pull signal and to said tracking error signal for providing a control signal to said second laser for automatically adjusting the wavelength of said second laser to a wavelength optimized for interacting with said magneto-optical layer.

5. The circuit of claim 4 wherein said means responsive to said push-pull signal includes a multiplier.

* * * * *